No. 799,074. PATENTED SEPT. 12, 1905.
F. L. MORSE.
DRIVE CHAIN.
APPLICATION FILED MAR. 21, 1902.
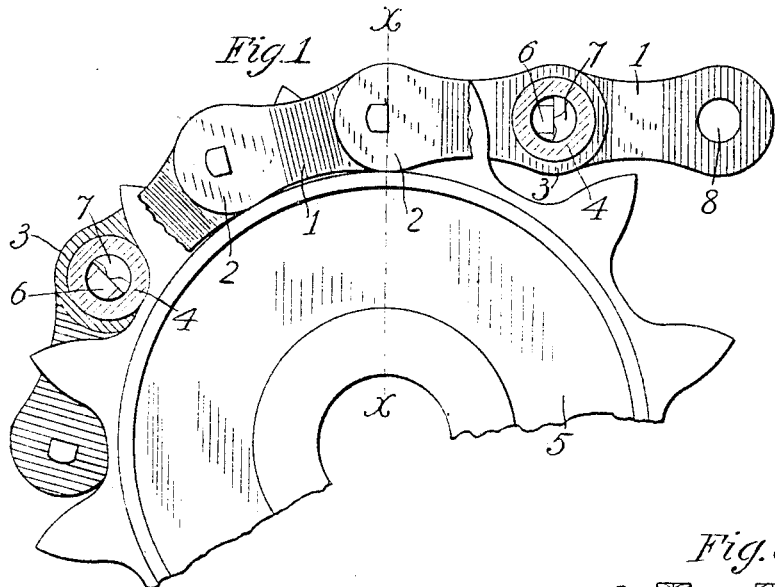
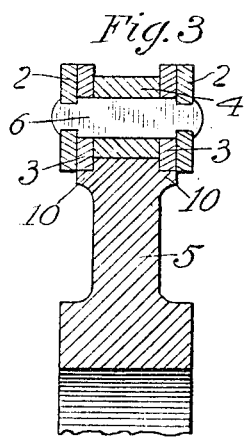
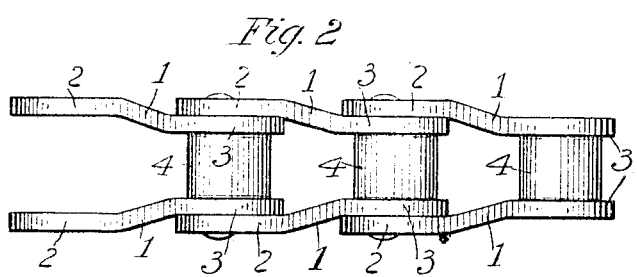
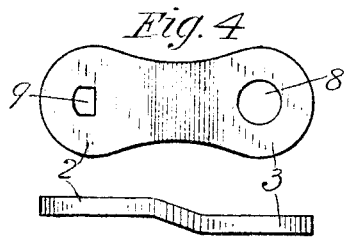
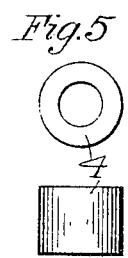
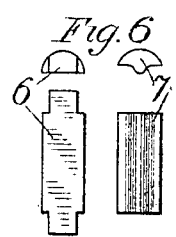
WITNESSES:
Jas. B. MacDonald.
INVENTOR.
Frank L. Morse
By
Wright
ATT'Y.

UNITED STATES PATENT OFFICE.

FRANK L. MORSE, OF TRUMANSBURG, NEW YORK, ASSIGNOR TO MORSE CHAIN COMPANY, OF TRUMANSBURG, NEW YORK.

DRIVE-CHAIN.

No. 799,074. Specification of Letters Patent. Patented Sept. 12, 1905.

Application filed March 21, 1902. Serial No. 99,330.

*To all whom it may concern:*

Be it known that I, FRANK L. MORSE, a citizen of the United States, residing in Trumansburg, county of Tompkins, State of New York, have invented or discovered a certain new and useful Improvement in Drive-Chains, of which improvement the following is a specification.

This invention relates to drive-chains, and more particularly to that class of these chains wherein the links are joined by two-part pintles and rollers or sleeves are interposed to make engagement with the sprockets, the object being to provide a chain of this type in which all the links shall be duplicates, thereby cheapening the cost of manufacture, and in which each link shall be a driving member whereby each roller or sleeve engages directly with both the driving and driven sprockets, thus securing smooth and even running and uniform wear at all the joints.

The invention consists in a chain having laterally-bent links joined by two-part pintles provided with rollers or sleeves, and it also consists in certain novel combinations and improved construction, all as hereinafter more fully set forth.

In the accompanying drawings, Figure 1 is a view showing a part of a sprocket-wheel with a portion of my improved form of chain thereon, some of the side links being broken away to show the construction of the joints. Fig. 2 is a plan view showing several links of the chain. Fig. 3 is a transverse section taken on the line *x x* of Fig. 1. Fig. 4 shows a side elevation and plan of one of the side links. Fig. 5 shows similar views of the roller, and Fig. 6 shows corresponding views of the seat-pin and rocking pin comprising the two-part pintle.

The chain is composed of side links 1, each of which is bent laterally, forming an outside end 2 and an inside end 3, which may be arranged at the joints as shown, so that each link has one end outside of the end of the adjacent link at one joint and the other end inside of the adjacent link at the other joint.

The joints are made up of two-part pintles comprising seat-pins 6 and rocking pins 7, the seat-pins passing through the openings 8 of the inside ends 3 of the links at each joint and being secured at their ends in the angular-shaped openings 9 of the outside ends 2.

In order to insure the proper working of the pintle, the seat-pin is provided with a hard substantially plane steel surface, which engages with a coacting surface on the rocking pin, so that these parts may rock freely upon each other, and the seat-pins are also fixed in position in the outer ends 2 of the links with their bearing-surfaces arranged substantially perpendicular to the line of pull and all facing in the same direction, as clearly indicated in Fig. 1.

The rocking pin 7 rests at its ends in the openings 8 at the inside ends of the side links and bears along its narrow edge against the face of the seat-pin, as shown. Around the parts of the pintle and between the inside ends of the side links the roller 4 is located and preferably fitted to roll freely about the pintle and into and out of engagement with the sprockets.

In case large sprocket-wheels are used or where the pull is light it is not absolutely necessary that the roller or sleeve should be fitted loosely; but it may, if desired, be rigidly secured to the ends of the side links.

It will be observed that the side links are all duplicates and interchangeable, thus providing a construction which can be manufactured at little expense, since the side links may be readily punched out and pressed to shape.

The sprocket-wheel 5 may, if desired, be provided with flanges 10 for supporting the inside ends 3 of the links during the passage of the chain around the wheel.

As the chain passes onto the sprocket-wheel a sprocket enters between each pair of side links and bears against each roller or sleeve, so that the strain is applied equally to all the joints, the action of which will be uniform, since the arrangement of the links and the two-part pintle is the same at all the joints. By this means the wear is evenly distributed on all parts and a smooth-running chain is obtained.

Having now described my invention, what I claim as new, and desire to secure by Letters Patent, is—

1. In a drive-chain, the combination with laterally-bent side links, each having an outside end and an inside end, of seat-pins connecting the outside ends and passing through the inside ends of adjacent links, rocking pins connecting the inside ends and bearing on said seat-pins, and rollers or sleeves surrounding the seat and rocking pins between the inside ends of the links.

2. A drive-chain composed of links and two-part pintles joining said links, the seat-pins of said pintles having their bearing-faces substantially perpendicular to the line of pull and all facing in the same direction, and a roller or sleeve surrounding the parts of the pintle.

3. In a drive-chain, the combination of laterally-bent side links each having an outside end and an inside end, two-part pintle-joints for said links, each having a seat-pin and a rocking pin, the outside ends of the side links engaging the seat-pins and the inside ends engaging the rocking pins, and a roller or sleeve surrounding the parts of the pintle.

4. A drive-chain having laterally-bent side links, two-part pintles joining said links and composed of seat-pins and rocking pins, the seat-pins being secured in the outside ends of the side links with their bearing-faces substantially perpendicular to the line of pull and all facing in the same direction and a roller or sleeve surrounding the parts of the pintle.

5. In a drive-chain, the combination with laterally-bent side links each having an outside end and an inside end, of a pintle formed in two parts comprising a seat-pin and rocker, and a roller surrounding the parts of the pintle.

6. A drive-chain comprising laterally-bent side links, each having an outside end and an inside end, pintles formed in separate parts, of which one part is secured to the inside ends, and the other part is secured to the outside ends and turns upon the other part of the pintle, and a roller surrounding the parts of the pintle.

In testimony whereof I have hereunto set my hand.

FRANK L. MORSE.

Witnesses:
R. F. EMERY,
JAS. B. MACDONALD.